United States Patent [19]
de Waal

[11] Patent Number: 5,263,796
[45] Date of Patent: Nov. 23, 1993

[54] SELF-CLOSING CLAMPING APPARATUS

[75] Inventor: Hendricus G. de Waal, Surrey, Canada

[73] Assignee: Canadian Rubber & Steel Ltd., Delta, Canada

[21] Appl. No.: 727,893

[22] Filed: Jul. 10, 1991

[51] Int. Cl.⁵ ............................. F16L 1/04; F16L 3/00
[52] U.S. Cl. ................................. 405/172; 405/158; 248/49
[58] Field of Search ............... 405/154, 158, 171, 172, 405/173; 248/49, 74.1

[56] References Cited

U.S. PATENT DOCUMENTS

| | | | |
|---|---|---|---|
| 1,951,660 | 3/1934 | Klaudt | 248/354.3 X |
| 2,226,789 | 12/1940 | Tupy | 294/106 |
| 3,173,271 | 3/1965 | Wittgenstein | 405/171 X |
| 3,664,621 | 5/1972 | Savoie | 248/74.1 |
| 4,252,466 | 2/1981 | Berti et al. | 248/49 X |
| 4,389,034 | 6/1983 | Suttles | 248/49 |
| 4,494,893 | 1/1985 | Migliavacca | 248/49 X |
| 4,511,169 | 4/1985 | Willis | 294/116 |
| 4,522,439 | 6/1985 | Haney | 294/110.1 |
| 4,624,432 | 11/1986 | Salacuse | 248/316.5 |
| 4,858,861 | 8/1989 | Wilkinson | 248/74.1 |
| 4,997,148 | 3/1991 | Sherman | 248/74.1 |
| 5,007,768 | 4/1991 | Waller | 405/154 |

FOREIGN PATENT DOCUMENTS

| | | | |
|---|---|---|---|
| 351524 | 1/1990 | European Pat. Off. | 248/49 |
| 3106794 | 9/1982 | Fed. Rep. of Germany | 248/74.1 |
| 7317520 | 6/1974 | Netherlands . | |
| 2027157 | 2/1980 | United Kingdom . | |

Primary Examiner—Dennis L. Taylor
Assistant Examiner—John Ricci
Attorney, Agent, or Firm—Barrigar & Oyen

[57] ABSTRACT

A clamping apparatus for lockingly engaging and supporting a length of conduit, such as a pipeline span extending above an irregular seabed. The clamping apparatus includes a saddle shaped to overlie the conduit span to be supported and a frame straddling the saddle and pivotably coupled thereto. The saddle includes clamps which automatically swing to a closed position when the saddle is seated on the conduit. The frame has extensible legs for supporting the conduit on an underlying support surface, such as a sandy seabed.

48 Claims, 11 Drawing Sheets

SELF-CLOSING CLAMPING APPARATUS

FIELD OF THE INVENTION

This application relates to a clamping apparatus for engaging and supporting a length of conduit, such as an underwater pipeline. More particularly, this application pertains to a self-closing clamping apparatus which lockingly engages a conduit span when lowered thereon from above and which includes extensible legs for supporting the conduit span above a support surface, such as the ocean floor.

BACKGROUND OF THE INVENTION

When conduits, such as gas pipelines, are installed underwater they often can not lie flat on the ocean floor. Rather, depressions or risers on the ocean floor may result in unsupported pipeline spans of considerable length. Some means must be provided to support the pipeline at such locations in order to prevent dynamic vortex-induced oscillations of the pipeline and subsequent risk of fatigue failure. For gas pipelines, the risk of stress fatigue is particularly acute when the pipeline is initially hydrotested.

Conventionally, cement grout is pumped from a surface vessel into bags placed underneath the pipeline span which is to be supported. This is an extremely costly and time-consuming procedure, especially in areas having undulating terrain. If the seabed slope is particularly steep or the soil soft, special care must be taken to prevent the grout support bags from slipping out of place before the grout has set. In such instances grout bags must be filled gradually via several successive pours of grout material. Even if precautions are taken, failure rates on the order of 50% may occur.

The time required to position and fill a single, multilayered grout bag in deep water is typically on the order of 24–36 hours. Installation time may be lengthened significantly in the event of inclement weather, since the surface vessel must be maintained in a relatively stationary position during the entire procedure. Another major drawback of the conventional procedure is that a large amount of equipment and manpower is required to position and fill the grout bags.

It is known in the prior art to provide mechanical devices for engaging and elevating conduits, such as lengths of drill pipe and the like. For example, U.S. Pat. No. 4,511,169, which issued to Willis on Apr. 16, 1985, discloses a self-locking and unlocking elevator assembly which includes a pair of jaws having clamping surfaces for automatically engaging a tubular length of drill pipe as the elevator assembly is lowered into place over the pipe. U.S. Pat. No. 4,522,439, which issued to Haney on Jun. 11, 1985, also discloses an elevator assembly having jaws to allow closure over and clamping of a length of pipe.

However, the Willis and Hayne devices referred to above are primarily designed for successively removing lengths of drill pipe from a vertical bore hole and are not adapted for supporting selected portions of a gas pipeline laid over irregular seabeds. Accordingly, the need has arisen for a clamping apparatus which may be lowered onto a length of conduit from above and which includes means for automatically engaging the conduit and for securely anchoring the conduit above a support surface, such as the ocean floor.

SUMMARY OF THE INVENTION

In accordance with the invention, a self-closing clamping apparatus for engaging and supporting an elongate body, such as a length of conduit, is provided. The clamping apparatus includes a saddle shaped to conform to an exterior surface of the elongate body, the saddle having opposed side portions defining a compartment therebetween for receiving the elongate body. Clamping means hingedly connected to the saddle are swingable between an open position partially extending within the compartment and a closed position clampingly engaging a portion of the elongate body exterior surface. The clamping means automatically swings from the open position to the closed position when the saddle is seated on the elongate body.

Preferably the clamping means includes a pair of clamps, each clamp being hingedly connected to one of the saddle side portions. The saddle side portions are slotted to permit swinging movement of the clamps between the open and closed positions through the saddle side portions.

Advantageously, each of the clamps includes a clamping surface shaped to conform to the elongate body exterior surface, the clamping surface having first and second ends. When the clamping apparatus is in the open position, the clamp first ends extend outwardly of the saddle side portions and the clamp second ends extend within the compartment. Placement of the elongate body into the compartment as the saddle is seated on the elongate body forces the clamping surface seconds ends outwardly away from one another, thereby swinging the clamping surface first ends inwardly toward one another.

Preferably, the clamping apparatus also includes biasing means for urging the clamping means to the open position. The biasing means may include a tensile member connectible between the clamping surface first ends.

Locking means may also be provided for releasibly locking the clamping means in the closed position. Preferably, the locking means fastens the clamping surface first ends together. In one embodiment, the locking means may include a bolt rotatably coupled to one of the clamps and swingable therewith. In an alternative embodiment, the locking means may include a housing mounted on the saddle; a bolt rotatable within the housing; and linkage means for operatively connecting the bolt and the clamping means.

The clamping apparatus may be adapted for engaging a cylindrical conduit elevated above a support surface. The saddle may include a semi-cylindrical upper surface extending between the saddle side portions for overlying an upper portion of the conduit. The clamps may include an arcuate clamping surface for engaging a lower portion of the conduit in the closed position.

Anchor means coupled to the saddle may also be provided for anchoring the clamping apparatus on a support surface. The anchor means may include a pair of support legs, each support leg being pivotably connected to one of the saddle side portions. The support legs are adapted for extending between the elevated conduit and the support surface. Since the centre of gravity of the support legs is below the point of pivotal connection of said support legs to said saddle, the support legs extend in a substantially vertical plane irrespective of the angle of inclination of the saddle relative to the support surface. Preferably, the support legs are angled outwardly to provide lateral support for the elevated conduit. The upper portions of the support legs may be connected by a transverse crosspiece, the support legs and the crosspiece together defining a swingable yoke straddling the saddle.

Advantageously, the support legs include telescopic shafts adjustable between retracted and extended positions. Elongated screws rotatable within respective shafts may be provided for adjusting the shafts between retracted and deployed positions. Preferably, means may be provided on the clamping apparatus for releasibly coupling a hydraulic wrench to the screws.

Flared boots may be mounted at the lower end of the support legs for securely engaging the support surface and for spreading the load of the conduit on the support surface.

In an alternative embodiment, the clamping apparatus is not self-closing. Rather, the clamping apparatus may broadly comprise a saddle shaped to conform to an exterior surface of an elongate body; clamping means mounted on the saddle for engaging the elongate body; and a frame pivotably coupled to the saddle for anchoring the elongate body on a support surface.

BRIEF DESCRIPTION OF THE DRAWINGS

In the accompanying drawings which illustrate various embodiments of the invention.

DETAILED DESCRIPTION OF THE PREFERRED EMBODIMENT

Figure 1:
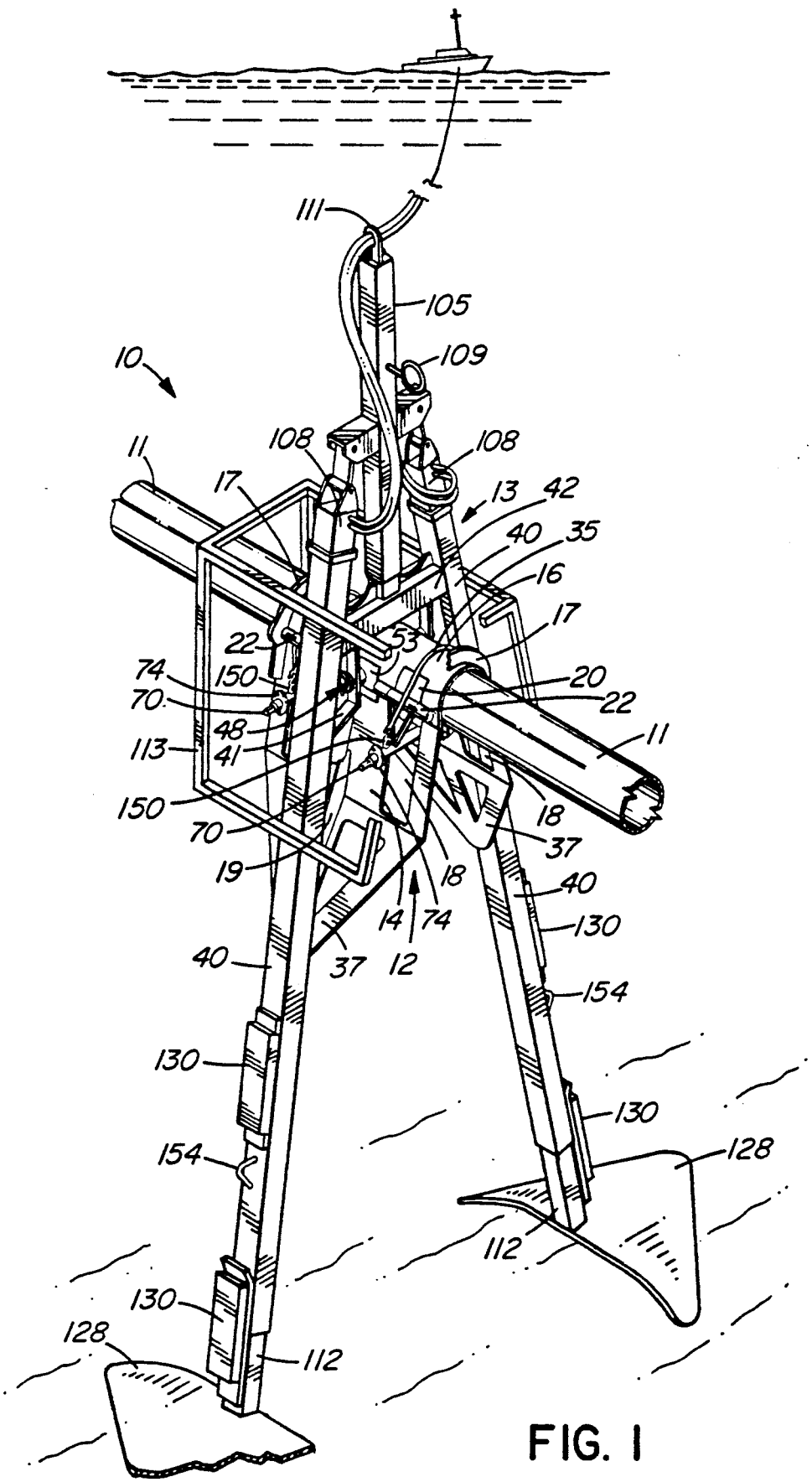
FIG. 1 is a fragmented, isometric view of the clamping apparatus and attached toolpost in a deployed configuration seated on a conduit span.

FIG. 1 depicts a clamping apparatus 10 for clampingly engaging and supporting an elongate body, such as a length of cylindrical conduit 11 (typically a gas pipeline) extending above a support surface, such as the ocean floor.

Clamping apparatus 10 includes an elongated saddle 12 shaped to overlie a length of conduit 11, and a frame 13 straddling saddle 12 and pivotally coupled thereto. As discussed in further detail below, frame 13 is swingable relative to saddle 12 and includes extensible support legs generally designated 40 for anchoring clamping apparatus 10 on the underlying support surface.

Figure 4:
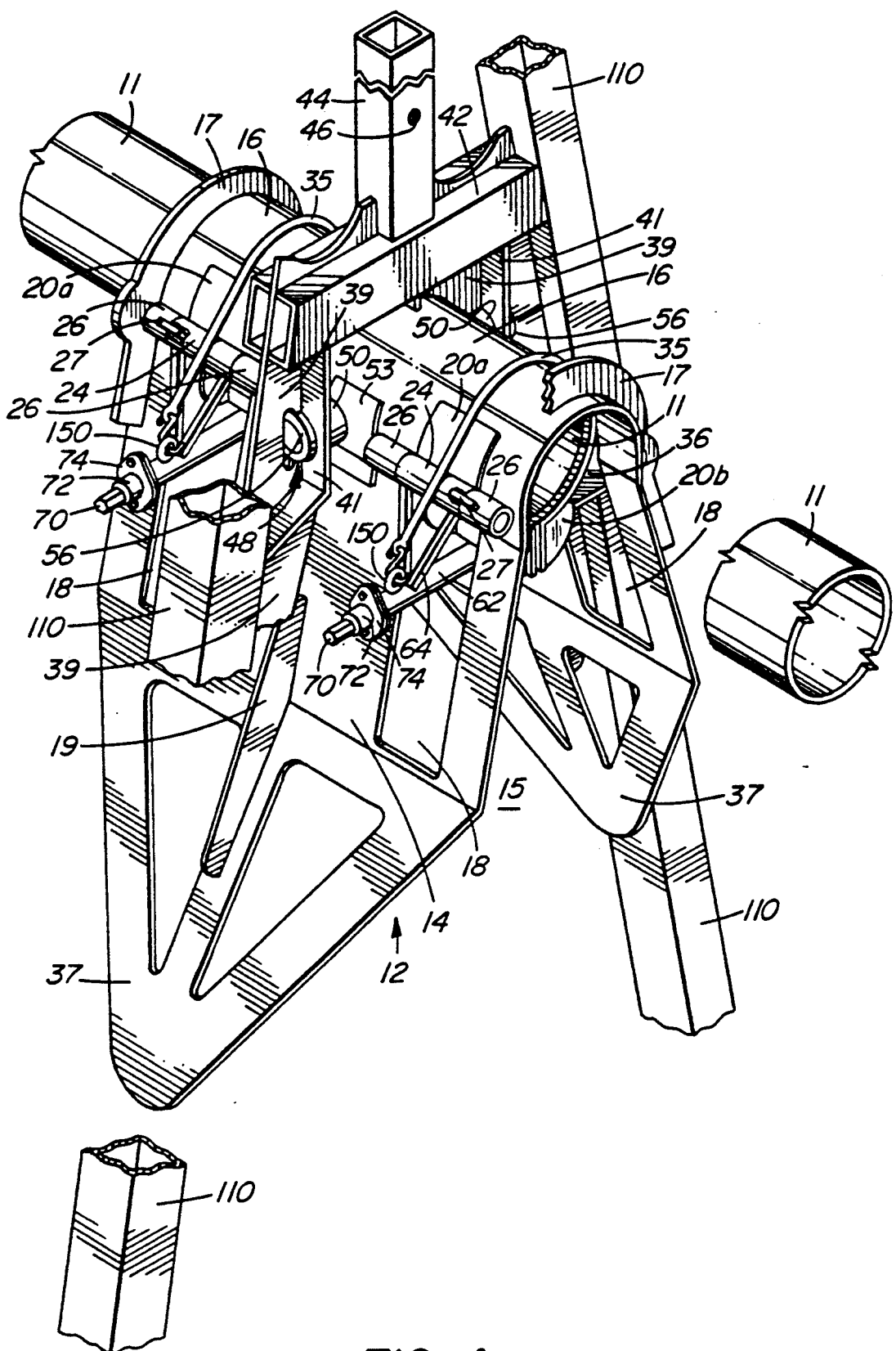
FIG. 4 is an enlarged, fragmented, isometric view of the clamping apparatus saddle in a deployed configuration seated on a conduit span.
Figure 5:
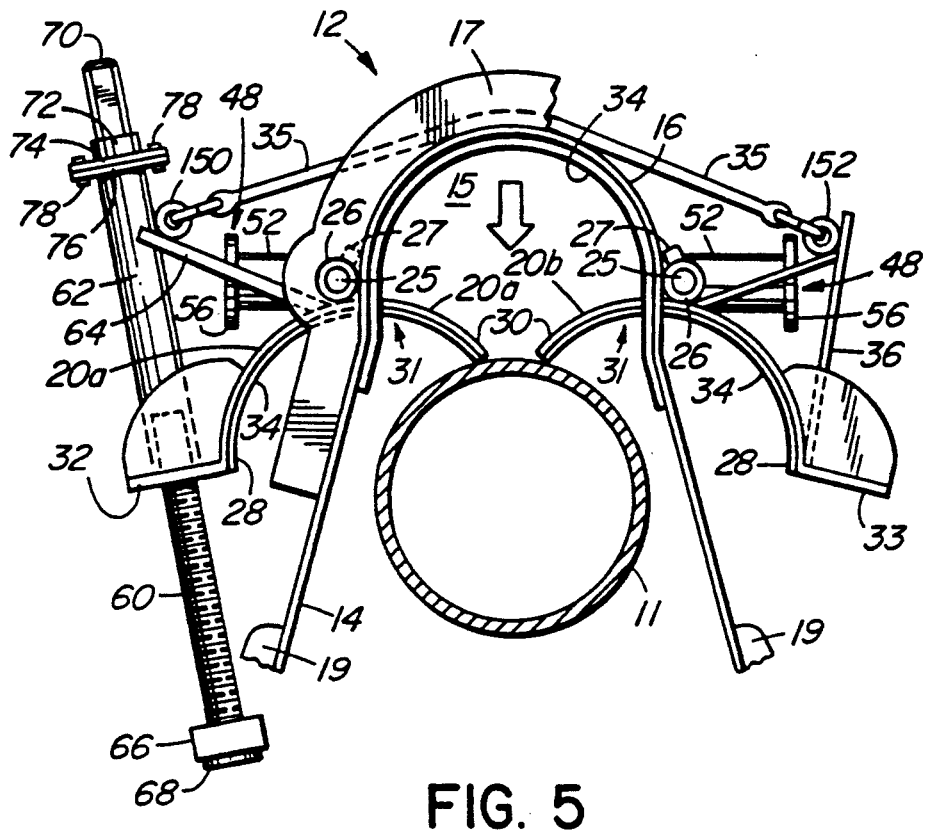
FIG. 5 is an enlarged, fragmented end view of the clamping apparatus saddle about to be seated on a conduit span, showing the clamping assembly in an open configuration.
Figure 6:
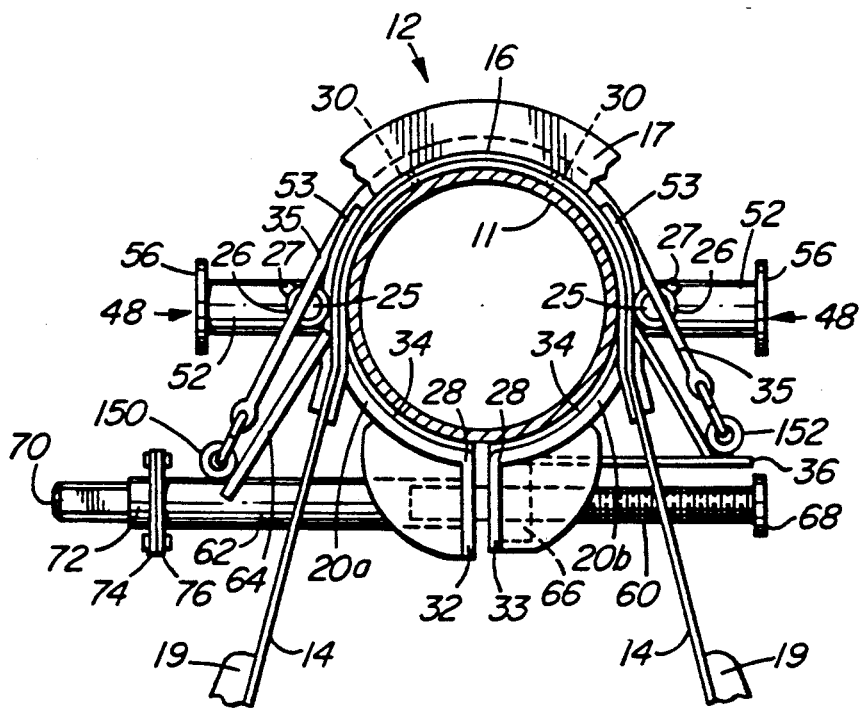
FIG. 6 is an end view of the clamping apparatus saddle of FIG. 5 seated on a conduit span, showing the clamping assembly in a closed and locked configuration.

With reference to FIGS. 4–6, saddle 12 consists of a pair of opposed sidewalls 14 integrally connected by a semi-cylindrical upper wall 16. Sidewalls 14 and upper wall 16 together define an open-bottomed compartment 15 for receiving a length of conduit 11 (FIG. 5). Sidewalls 14 are preferably planar and, when clasped about conduit 11 as hereinafter explained, are inclined outwardly at an angle of approximately 15° relative to the vertical. Stiffeners 17 may be fitted around either outer end of saddle 12 for structural support.

At least one clamp 20 (FIG. 2) is hingedly connected to saddle 12. In the preferred embodiment, two spaced-apart, self-closing clamps 20 are provided. Each clamp 20 includes clamp halves 20(a) and 20(b) which are hingedly connected to opposed saddle sidewalls 14 (FIG. 5). Saddle sidewalls 14 have cut-out slots 18 to permit free swinging movement of clamp halves 20(a) and 20(b) relative to saddle 12.

The number of clamps 20 mounted on saddle 12 may vary depending on the clamping force required for a particular application. For example, in some applications, saddle 12 could be elongated to enable mounting of three, four or more clamps 20. Preferably, the length of saddle 12 should be at least such that the surface area of saddle upper wall 16 in contact with conduit 11 is equal to or greater than the effective combined surface area of clamps 20 in contact with conduit 11 when clamping apparatus 10 is deployed. Of course, the clamping surface area in contact with conduit 11 may vary depending on the loads required to be transmitted through saddle 12.

Figure 2:
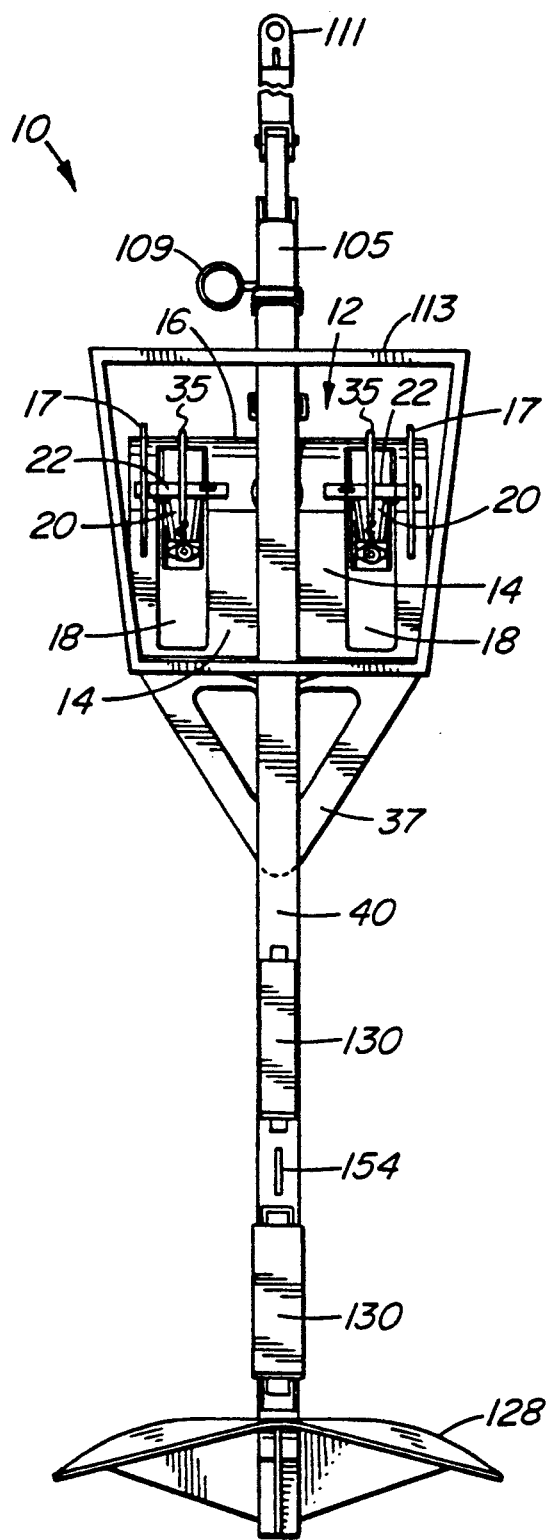
FIG. 2 is a side elevational view of the clamping apparatus and toolpost of FIG. 1 with the support legs retracted.

As shown best in FIG. 5, each clamp half 20(a), 20(b) has a first end 28, a second end 30 and an arcuate clamping surface 31 for engaging conduit 11 over an arc extending approximately 145 degrees between ends 28,30. Clamp halves 20(a), 20(b) are connected part way between ends 28, 30 to a respective saddle sidewall 14 by a hinge generally designated 22 (FIG. 2). As shown in FIG. 4, hinge 22 includes a tubular hinge sleeve 24 mounted on each clamp half 20(a), 20(b) and alignable with corresponding tubular hinge sleeves 26 mounted on opposite sides of saddle slots 18 (FIG. 4). Hinge 22 also includes a hinge pin 25 (FIGS. 5–6) insertable through hinge sleeves 24,26 to securely couple clamp halves 20(a) and 20(b) to respective saddle sidewalls 14. A stop bar 27 is fixed to clamp hinge sleeve 24 to limit rotation of sleeve 24 relative to sleeves 26. In an alternative embodiment, saddle hinge sleeves 26 may be omitted and shims may be positioned under the ends of hinge pin 25 to compensate for the offset resulting from the wall thickness of hinge sleeve 24. In a further alternative embodiment the plate thickness of saddle 12 adjacent clamps 20 may be increased.

Clamp halves 20(a), 20(b) are swingable about their respective hinges 22 to an open position shown in FIG. 5 in which second ends 30 extend within conduit receiving compartment 15, and first ends 28 extend outwardly of saddle sidewalls 14. When saddle 12 is lowered on to a length of conduit 11, clamps 20(a), 20(b) are automatically carried into the closed position shown in FIG. 6. In particular, as second ends 30 contact conduit 11 they swing outwardly away from one another, thereby swinging first ends inwardly and downwardly toward one another through slots 18. In the closed position shown in FIG. 6 the arcuate clamping surfaces 31 of each clamp half 20(a), 20(b) clasp respective lower portions of conduit 11.

As shown best in FIG. 5, clamping surfaces 31 and the inner surface of saddle upper wall 16 contacting conduit 11 may be covered with an lining 34 to cushion conduit 11 and protect against corrosion.

Figure 7:
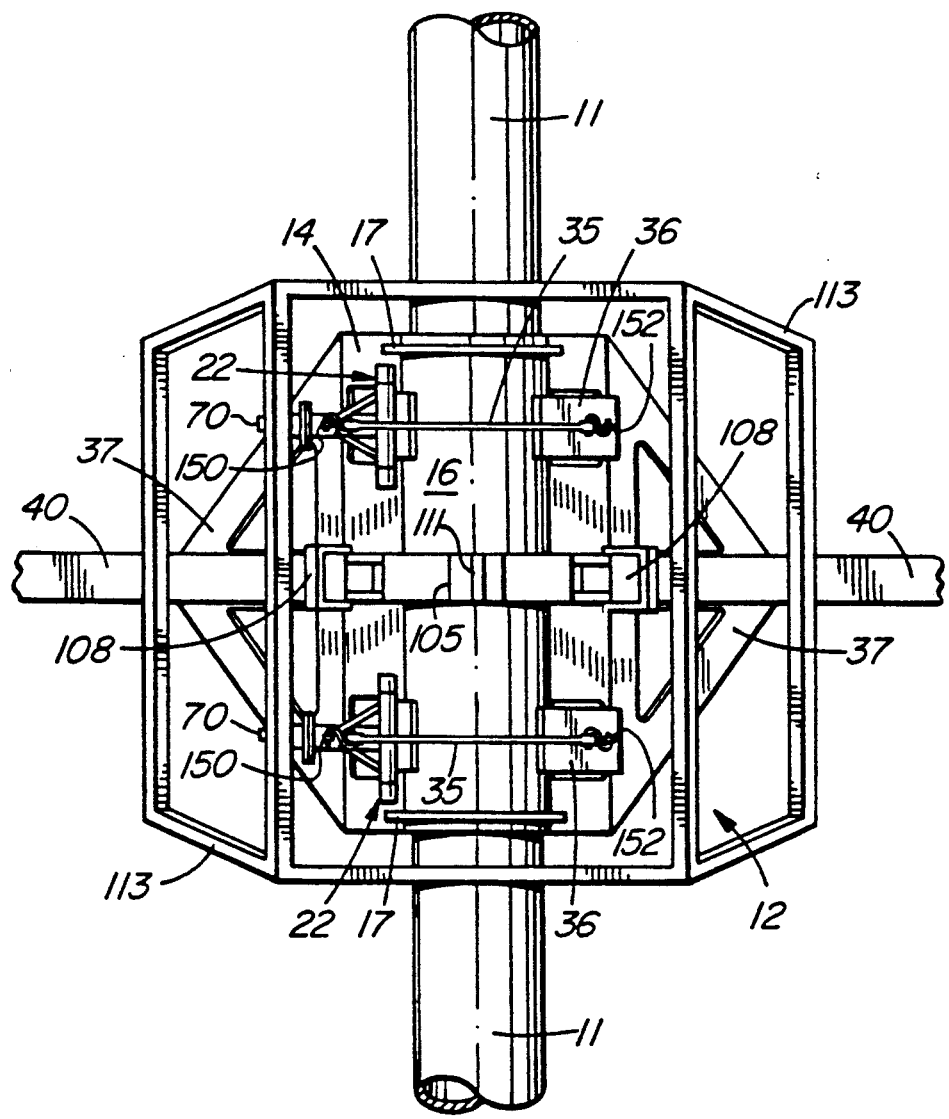
FIG. 7 is a fragmented, top plan view of the clamping apparatus and attached toolpost, showing the clamping assembly in a closed position.

In the preferred embodiment of the invention, a biasing means, such as an elastomeric bungey cord 35, is also provided for urging clamps 20(a) and 20(b) toward the open position. As shown best in FIGS. 5-7, elastomeric cord 35 is fastened at one end to a hasp 150 connected to bolt housing 62 mounted on clamp half 20(a); and, at the opposite end, to a hasp 152 connected to plate 36 which extends from first end 28 of clamp half 20(b). Elastomeric cord 35 is entrained over the arcuate upper wall 16 of saddle 12 to urge first ends 28 upwardly and outwardly toward the open position shown in FIG. 5 when saddle 12 is not seated on conduit 11. As shown in FIGS. 4 and 5, stop bar 27 fixed to clamp hinge sleeve 24 prevents rotation of clamp halves 20(a), 20(b) beyond the preferred open position (in which second ends 30 extend within conduit receiving compartment 15). When saddle 12 is lifted clear of conduit 11, elastomeric cord 35 causes clamp halves 20(a), 20(b) to swing toward the open position until stop bar 27 contacts saddle upper wall 16 (FIG. 5).

Clamping apparatus 10 may also include "guiding means" for guiding a length of conduit 11 into conduit receiving compartment 15. As shown best in FIGS. 4 and 8, the guiding means preferably comprises triangular flared guide plates 37 which are integrally joined to the lower ends of saddle sidewalls 14 and extend downwardly and outwardly therefrom. Stiffening ribs 19 bridging the central portion of saddle sidewalls 14 and guide plates 37 may be provided for added structural support. Guide plates 37 serve to guide saddle 12 onto conduit 11, such as by causing saddle 12 to shift sideways as it is lowered to ensure that the longitudinal axes of saddle 12 and conduit 11 are in alignment. Guide plates 37 are preferably outwardly inclined at an angle of approximately 27° relative to a vertical axis (or approximately 13° relative to the plane of saddle sidewalls 14).

Clamping apparatus 10 also includes "locking means" for releasably locking each pair of clamp halves 20(a), 20(b) together in the closed position. As shown in FIGS. 5 and 6, the locking means preferably comprises a captured, externally threaded bolt 60 and an internally threaded block nut 66 which travels to a locking position when bolt 60 is rotated. Bolt 60 is rotatable within bolt housing 62 which is pre-mounted on clamp half 20(a). More particularly, bolt housing 62 is integrally connected to plate 32 which extends from first end 28 of clamp half 20(a). Bolt housing 62 is fixed proximate hinge sleeve 24 by means of a pair of rods 64. In the unlocked position, block nut 66 is positioned at the exposed, free end of bolt 60 remote from housing 62 (FIG. 5). A keeper plate 68 is fixed on the bolt free end to prevent detachment of nut 66 from bolt 60.

Bolt 60 preferably has a threaded stepped portion at the bolt end opposite keeper plate 68 for receiving an internally threaded hexagonal coupling nut 70. After coupling nut 70 has been screwed onto bolt 60 and set for correct clearance, nut 70 is integrally connected to bolt 60, such as by welding. Rotation of bolt 60 is actuated by applying a rotary force to nut 70, for example with the aid of a hydraulic wrench. Nut 70 is separated from bolt housing 62 by a loose-fit cylindrical spacer 72. Spacer 72 abuts against a loose-fit flange 74 which is fastened to the flanged end 76 of bolt housing 62 with bolts 78 to prevent axial travel of bolt 60.

When clamp halves 20(a), 20(b) are swung to the closed position shown in FIG. 6, bolt 60 assumes a generally horizontal orientation underneath conduit 11. The first end 28 of mating clamp half 20(b) carries a slotted plate 33 which receives the exposed end of bolt 60. In the closed position, one side of block nut 66 is seated against plate 36 extending from first end 28 of clamp half 20(b; this prevents nut 66 from rotating freely with bolt 60. Hence, when a rotary force is applied to hexagonal nut 70, such as by a hydraulic impact wrench manipulated and activated by an underwater diver or remote underwater vehicle, bolt 60 rotates, causing block nut 66 to travel along the length of bolt 60 toward housing 62 until block nut 66 is seated securely against plate 33, thus locking clamp halves 20(a) and 20(b) together (FIGS. 6 and 8) The locking mechanism may be released by rotating bolt 60 in the opposite direction.

An alternative embodiment of the locking means is illustrated in FIGS. 9-12. In this alternative embodiment a locking assembly generally designated 79 is mounted on saddle upper surface 16 immediately above clamps 20. As discussed in further detail below, the primary advantage of this alternative embodiment is that locking assembly 79 is more readily accessible to divers or underwater remote operated vehicles (ROVs) fitted with hydraulic wrenches. Locking assembly 79 is also preferable if clearances underneath saddle 12 are limited.

Alternative locking assembly 79 comprises a unitary shaft 80 having hexagonal end portions 82; and, left hand threaded and right hand threaded portions 84, 86 respectively. Shaft 80 extends within housing 88 which is shaped to overlie saddle upper wall 16, immediately above clamps 20. In this embodiment, stiffeners 17 (FIG. 4) are ordinarily omitted, since housing 88 provides sufficient structural support for saddle 12.

Nuts 90, 92 are threaded onto shaft threaded portions 84, 86 respectively. Hence, rotation of shaft 80 causes nuts 90,92 to travel outwardly (i.e. away from one another) toward shaft ends 82; or, inwardly (i.e. toward the centre of shaft 80) depending upon the direction of rotation. Shaft 80 thus functions as a turnbuckle.

Figure 9:
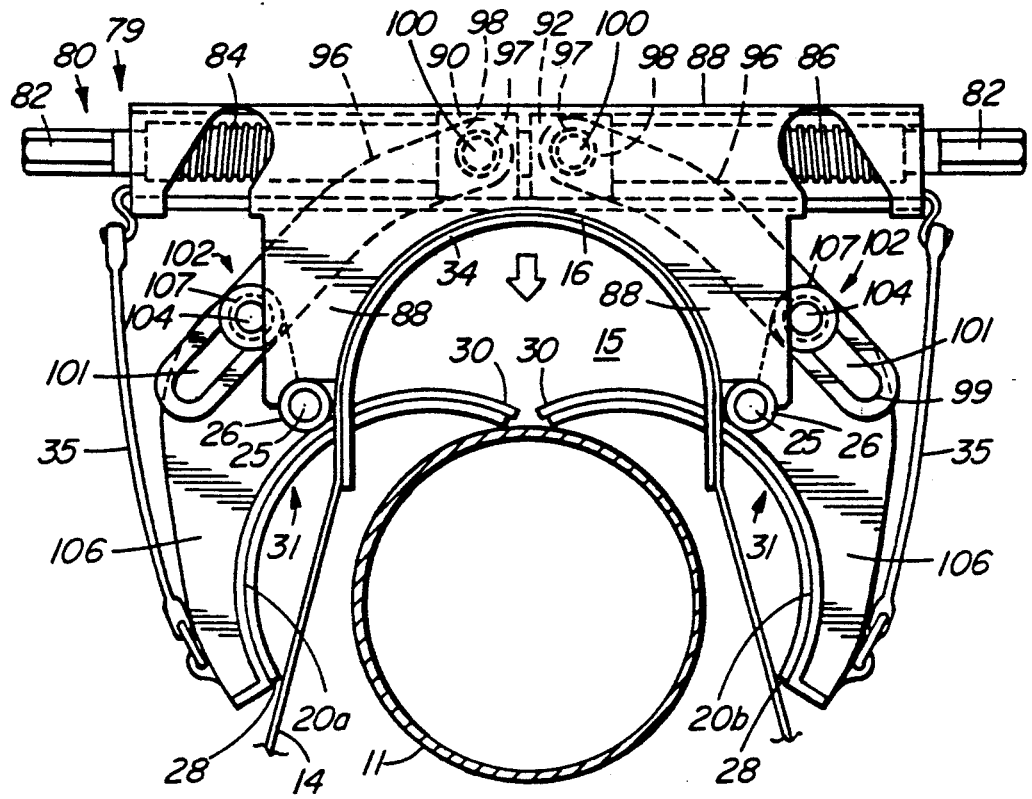
FIG. 9 is an end view of the clamping apparatus saddle about to be seated on a conduit span showing the clamping assembly in an open position and illustrating an alternative embodiment of the locking assembly.

Each nut 90, 92 is operatively connected to either clamp halve 20(a) or 20(b) by means of a pair of linkages 96. Each linkage 96 has an upper end 98 and a lower end 99. As shown in FIG. 9, linkage upper end 98 is preferably apertured for receiving cylindrical stubs 100 which are machined on the lateral surfaces of nuts 90, 92. A set collar 97 may be provided for loosely coupling linkage upper ends 98 to stubs 100.

Linkage lower end 99 is coupled to a hinge assembly 102 mounted on clamp halves 20(a) or 20(b) as the case may be. Hinge assembly 102 includes a hinge pin 104 which is mounted on clamp halves 20(a) or 20(b) outwardly of hinge 22 by means of connector plates 106. Connector plates 106 are integrally connected to the arcuate outer surface of clamp halves 20(a) and 20(b) and are apertured to accommodate hinges 22 and 102.

Set collars 107 or similar fasteners are fitted on to the ends of hinge pin 104 to loosely couple pin 104 to linkages 96. As shown clearly in FIGS. 9-11, linkage lower end 99 includes an elongate slot 101 to enable pivoting movement of hinge assembly 102 relative to saddle 12. In particular, hinge pin 104 pivots freely within linkage slot 101 as clamp halves 20(a) and 20(b) swing between the open position (FIG. 9) and the closed position (FIG. 10) as saddle 12 is seated on conduit 11.

In the alternative locking assembly 79 described above, the biasing means preferably consists of a pair of elastomeric cords 35, each fastened at one end to housing 88 above saddle 16 and at the other end to a hasp projecting from the first end 28 of clamp half 20(a) or 20(b) as the case may be. Cords 35 bias clamp halves 20(a) and 20(b) toward the open position wherein the clamp second ends 30 extend within the conduit receiving compartment 15 defined by saddle 12 (FIG. 9).

Figure 10:
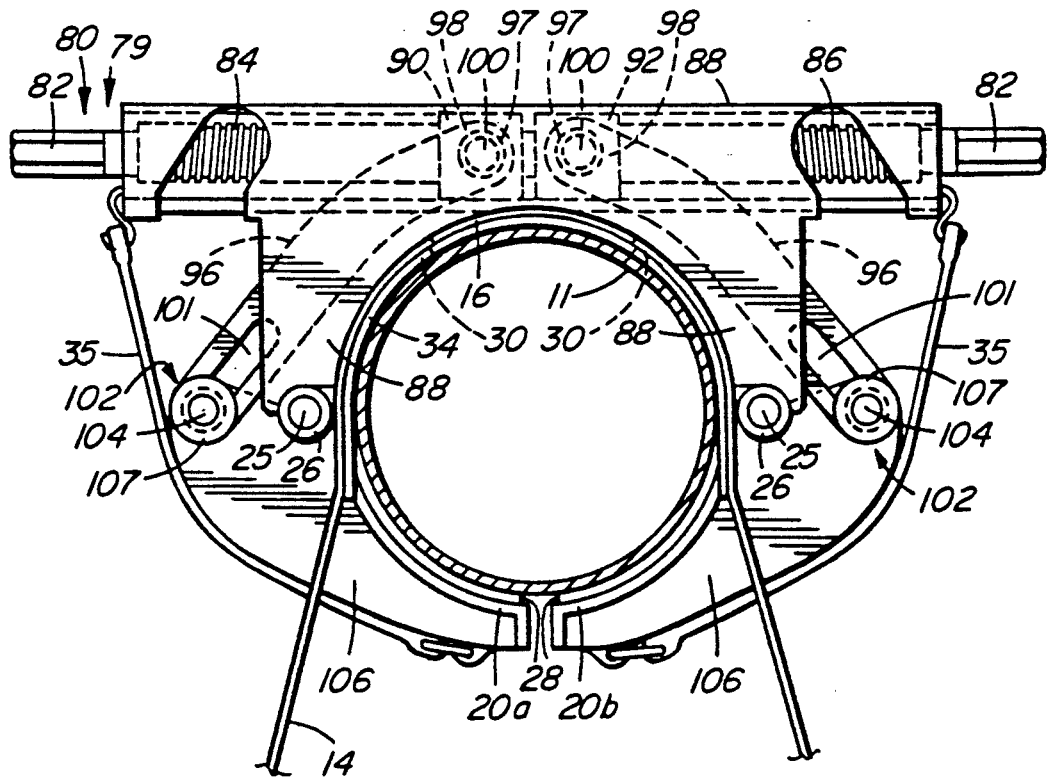
FIG. 10 is an end view of the clamping apparatus saddle of FIG. 9 seated on a conduit span showing the clamping assembly in a closed position.
Figure 11:
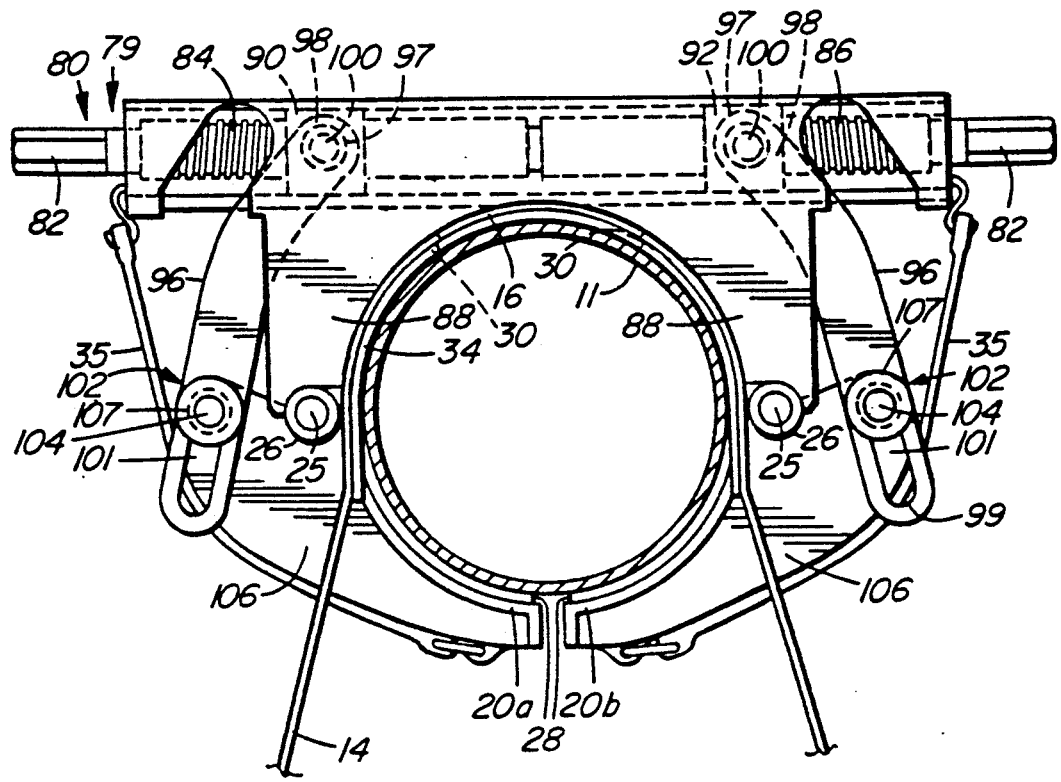
FIG. 11 is an end view of the clamping apparatus saddle of FIG. 10 showing the alternative locking assembly in a locked configuration.

With reference to locking assembly 79 illustrated in FIGS. 9-11, clamp halves 20(a) and 20(b) are locked in the closed position by rotating shaft 80, such as by securing a hydraulic impact wrench to one of the shaft hexagonal end portions 82 and actuating the wrench. Depending upon which end 82 of shaft 80 the wrench is secured to, clockwise or counterclockwise rotation of shaft 80 will cause nuts 90, 92 and attached linkages 96 to travel outwardly toward shaft ends 82. (The end plates of housing 88 supporting shaft hexagonal end portions 82 are preferably labelled to indicate which direction of rotation of shaft 80 will cause outward travel of nuts 90,92). Outward travel of nuts 90, 92 and attached linkages 96 applies an inwardly directed clamping force to clamp halves 20(a), 20(b) through hinge assembly 102 and connector plates 106. Clamp halves 20(a) and 20(b) are thus securely locked in the closed position as shown in FIG. 11. Since alternative locking assembly 79 causes clamp halves 20(a) and 20(b) to positively embrace conduit 11, it more effectively corrects for improper seating of saddle 12 than the first embodiment of the locking means employing captured bolt 60 and travelling nut 66 referred to above.

Clamp halves 20(a) and 20(b) may be returned to the unlocked position by rotating shaft 80 in the opposite direction, thus causing inward travel of nuts 90 and 92 and attached linkages 96. This releases the inwardly directed clamping force acting upon clamp halves 20(a) and 20(b) and allows hinge pins 104 to pivot upwardly within linkage slots 101 when saddle 12 is lifted clear of conduit 11. As described above, elastomeric cords 35 urge clamp halves 20(a) and 20(b) to swing to the open position when saddle 12 is lifted clear of conduit 11.

Figure 14:
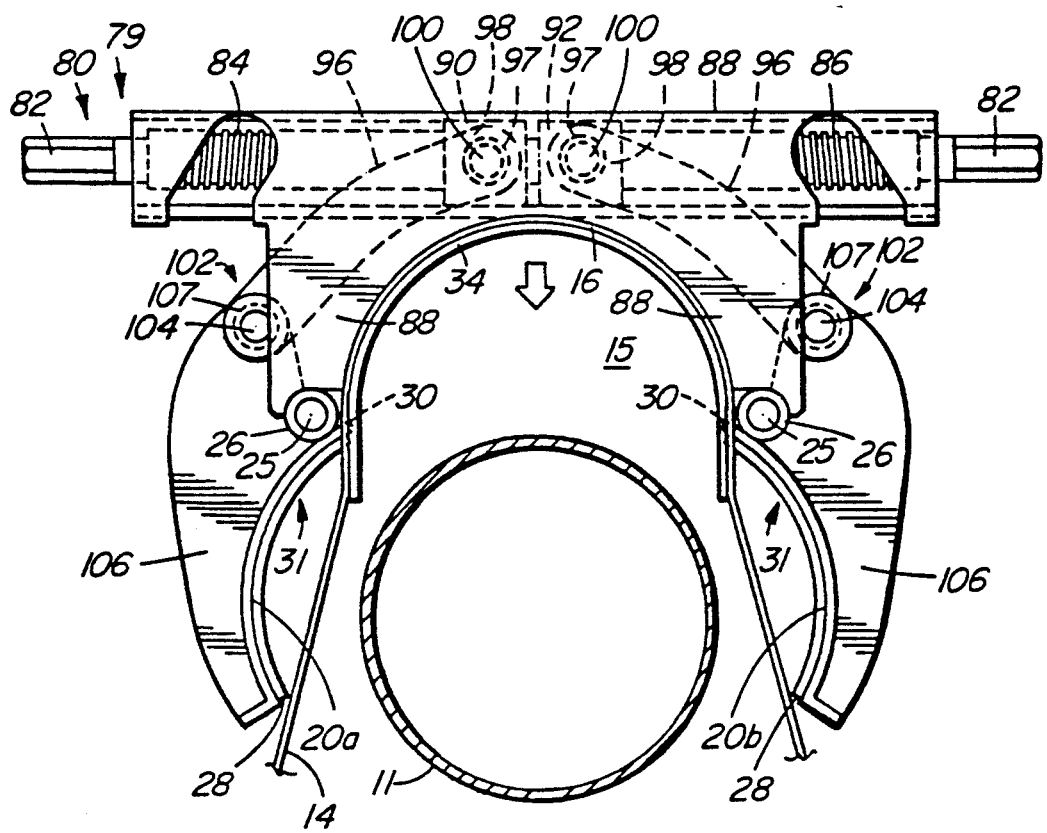
FIG. 14 is an end elevational view of the clamping apparatus saddle about to be seated on a conduit span showing the clamping assembly in an open position and illustrating a further alternative embodiment of the clamping assembly having truncated clamp halves.

In a further alternative embodiment of the invention shown in FIG. 14 the second ends 30 of clamp halves 20(a) and 20(b) are truncated so that they do not extend within conduit receiving compartment 15 in the open position. Accordingly, in this embodiment clamp halves 20(a), 20(b) do not close automatically when saddle 12 is seated on conduit 11. Rather, closure and locking of clamp halves 20(a), 20(b) is achieved by actuating locking assembly 79 after saddle 12 is seated on conduit 11. That is, rotation of shaft 80 causes outward travel of nuts 90 and 92 and attached linkages 96 which in turn results in transmittal of an inwardly directed clamping force to clamp halves 20(a) and 20(b) through linkages 96, hinge assembly 102 and connector plates 106 as discussed above. This causes truncated clamp halves 20(a) and 20(b) to swing to the closed position and lockingly engage conduit 11. In this alternative embodiment linkage slots 101 and elastomeric cords 35 are omitted since it is not necessary to allow for swinging movement of clamp halves 20(a) and 20(b) when saddle 12 is seated on conduit 11 (i.e hinge pin 104 is immovably rather than slidably coupled to linkage second ends 99).

The further alternative locking mechanism shown in FIG. 14 is particularly suited for applications wherein seating of saddle 12 on conduit 11 does not result in sufficient upwardly directed forces to actuate closure of clamps 20. For example, if buoyancy members are attached to clamping apparatus 10 during deployment, seating of saddle 12 on conduit 11 may not overcome the biasing forces urging clamp halves 20(a), 20(b) to the open position.

As indicated at the outset, clamping apparatus 10 also includes a swing frame 13 straddling saddle 12 for supporting conduit 11 on an underlying support surface. Frame 13 enables a load to be transmitted to or from conduit 11 through saddle 12.

Figure 3:
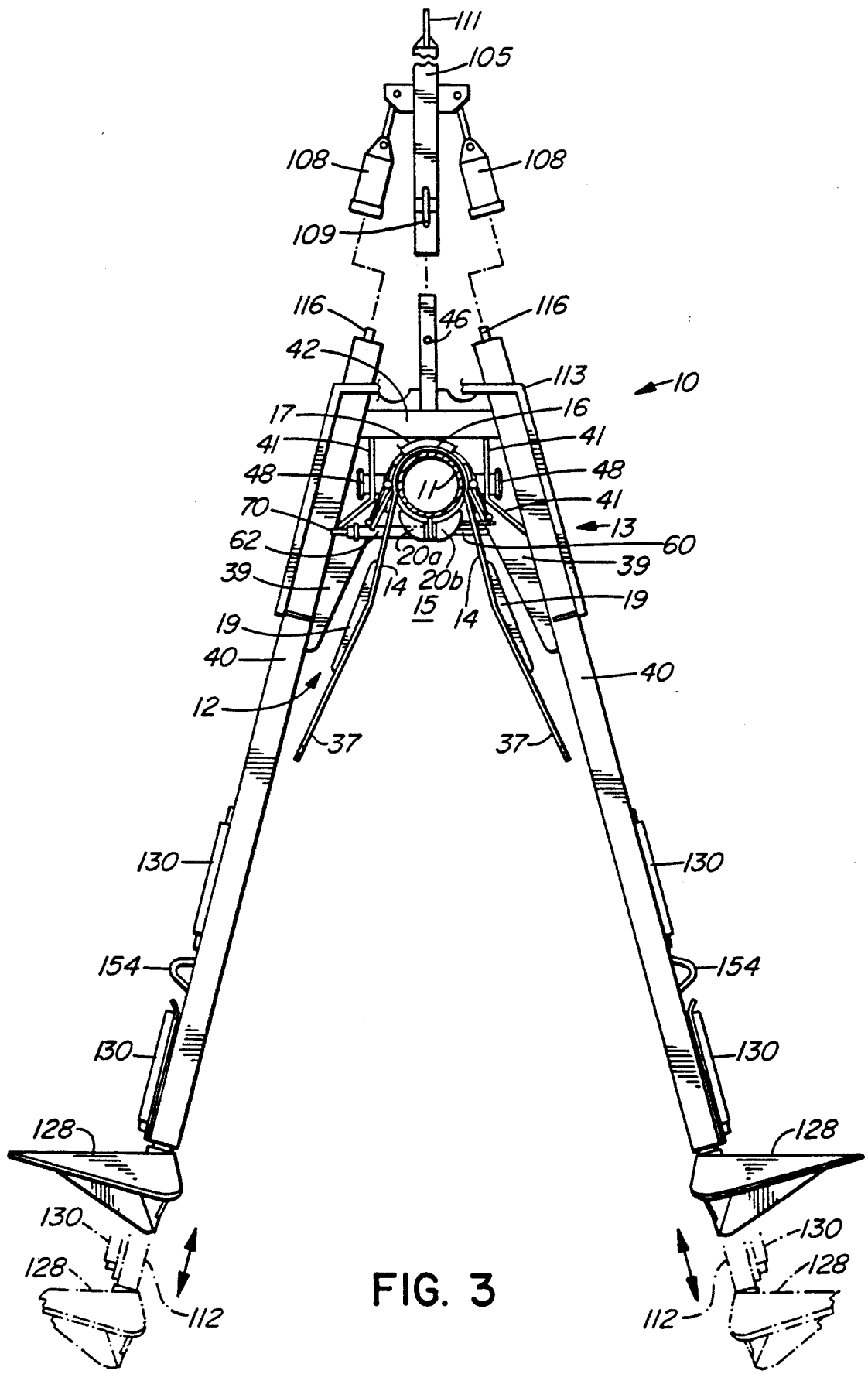
FIG. 3 is an end elevational view of the clamping apparatus of FIG. 1 showing the toolpost exploded from the upper end thereof and showing the support legs partially extended in phantom outline.

With reference to FIG. 3, frame 13 includes an inverted U-shaped plate 39 and a pair of extensible support legs 40 which are integrally joined to opposite outer edges of plate 39. More particularly, each leg 40 has an elongated square tubular housing 110 (FIG. 4) which is welded to the outer lateral edges of plate 39. Plate 39 is preferably about one half inches in thickness and has external ribs 41 to provide enhanced rigidity. As discussed below, ribs 41 are slotted to accommodate trunnions 48 for coupling swing frame 13 to saddle 12. The undersurface of plate 39 proximate its apex is arcuately curved to conform to the shape of saddle upper wall 16.

As shown in FIG. 4, the upper ends of leg member outer housings 110 are joined by a transverse crosspiece 42 integrally connected to plate 39. Crosspiece 42 extends above saddle 12 when clamping apparatus 10 is assembled. A post 44 having an aperture 46 formed therein projects upwardly from a central portion of crosspiece 42. As discussed in further detail below, post 44 is provided for coupling clamping apparatus 10 to a toolpost generally designated 105 (FIGS. 1-3).

A tubular cage 113 is integrally connected to the outer lateral surface of leg housings 110 as shown in FIGS. 1-3 and 7. Cage 113 is provided to protect saddle 12 during shipping. Additionally, cage 113 provides a rigid structure for manipulating clamping apparatus 10 by underwater divers or underwater remote operated vehicles (ROVs) during deployment.

Frame leg members 40 are gimballed to saddle 12 by means of a pair of in-line trunnions 48. As shown best in FIGS. 4-6, each trunnion 48 includes a cylindrical shaft 52 extending outwardly of saddle 12 perpendicular to the longitudinal axis of the saddle. Each shaft 52 is integrally connected to a mounting plate 53 located on a central portion of saddle 12 between clamps 20 (FIG. 4). During assembly of trunnions 48 a cylindrical bushing 50 is loosely fitted on each shaft 52 and a retainer ring 56 is then welded to the free end of shaft 52 to prevent detachment of bushing 50.

During fabrication of clamping apparatus 10 slotted ribs 41 are initially welded to plate 39 in two steps to enable trunnions 48 to be connected to frame 13. More particularly, one half of rib 41 is initially welded to plate 39 and then trunnions 48, comprising bushing 50, shaft 52 and retainer ring 56, are fitted into the slot defined by plate 39 and one half of rib 41. The other half of rib 41 is then welded to plate 39 so that each bushing 50 is captured within an aperture defined by plate 39 and rib 41. Finally bushing 50 is welded to plate 39 and the adjacent rib 41. Once trunnions 48 are assembled as aforesaid, each shaft 52 can rotate freely relative to its corresponding bushing 50 and hence frame 13 can swing freely relative to saddle 12.

In order for clamping apparatus 10 to work effectively, it is important that trunnions 48 share a common rotational axis. Depending on the application, trunnions 20 may be offset or non-symmetrically mounted to perform a given function.

Figure 12:
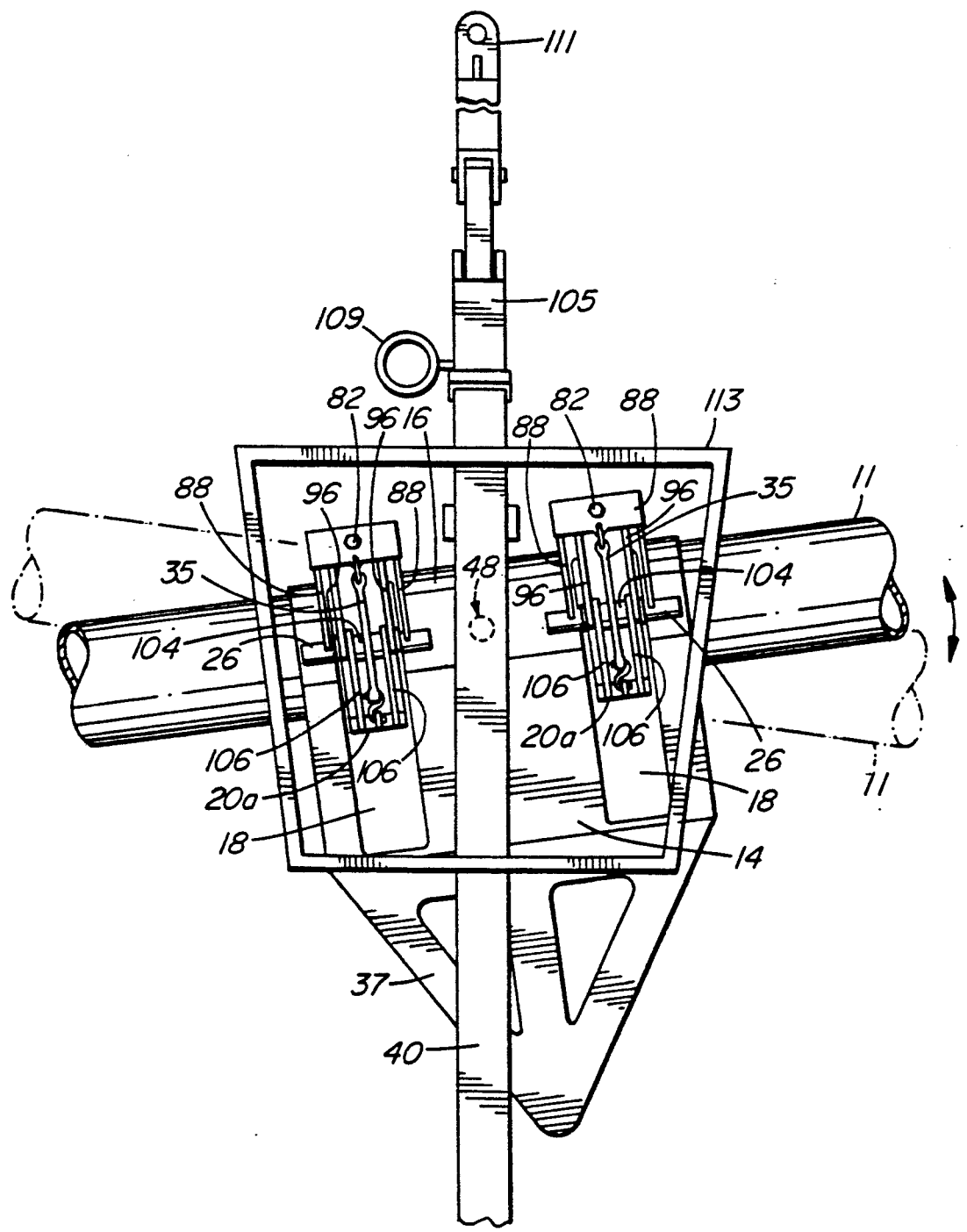
FIG. 12 is a side elevational view of the clamping apparatus of FIG. 10 seated on an inclined conduit.

Clamping apparatus 10 is designed so that the centre of gravity of swing frame 13 is below saddle trunnions 48. Accordingly, since frame 13 is freely swingable relative to saddle 12, extensible support legs 40 will extend substantially vertically irrespective of the angle of inclination of conduit 11 and hence saddle 12 (FIG. 12). Clamping apparatus 10 is thus designed to accommodate varying pipe slopes while maintaining support legs 40 in a vertical orientation.

As should be apparent to someone skilled in the art, other means for pivotably coupling swing frame 13 to saddle 12 may be substituted for trunnions 48. For example, a ball and socket joint or universal connection allowing rotation of frame 13 in more than one plane relative to saddle 12 could be provided.

Figure 13:
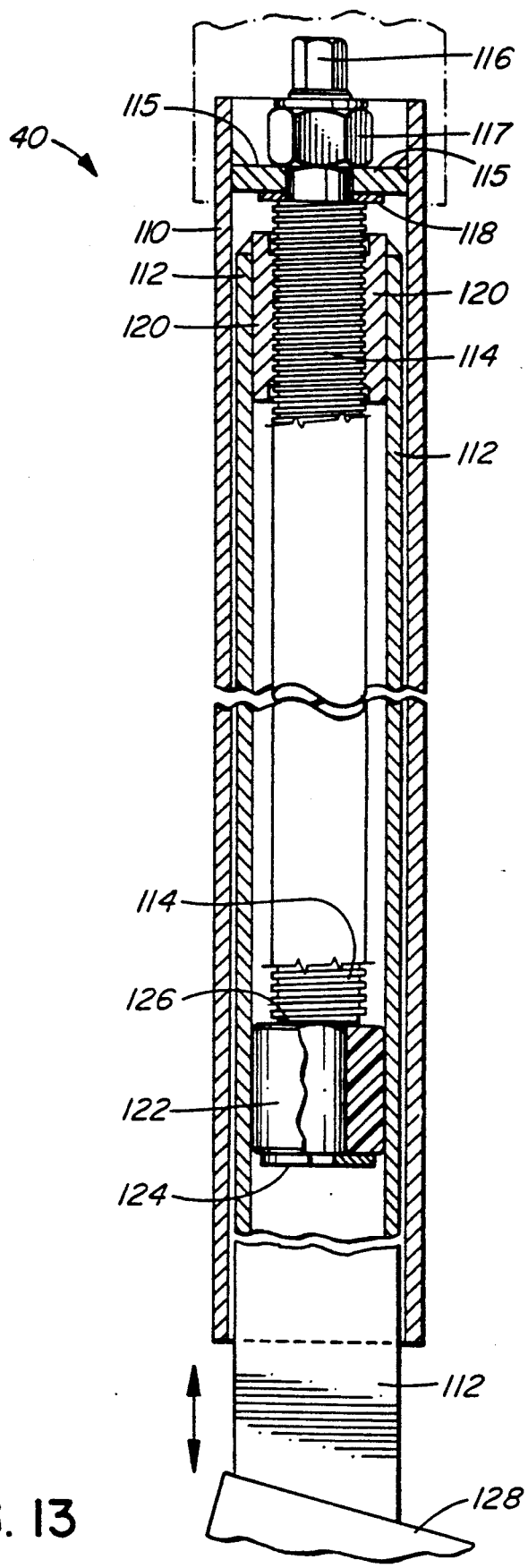
FIG. 13 is an enlarged, fragmented sectional view of one of the extensible support legs.

As indicated above, frame 13 includes extensible support legs 40 for anchoring clamping apparatus 10 on a support surface, such as the ocean floor. With reference to FIG. 13, which is a detailed illustration of the assembly of one support leg 40, reference numeral 110 denotes the outer housing which is welded to plate 39 as discussed above. An extensible inner leg 112 is telescopically slidable within housing 110. Both housing 110 and leg 112 are constructed of square tubing so they will not rotate relative to one another.

Support leg 40 also includes an externally threaded leg screw 114 which is fixed at its upper end to a transverse plate 115 extending within housing 110. The upper end of leg screw 114 includes a hexagonal end portion 116 for coupling with a hydraulic wrench to actuate rotation of screw 114. Screw 114 is rotatably coupled to plate 115 by means of threaded nut 117 and thrust washer 118. Nut 117 is securely connected to screw 114, such as by machining a bore through nut 117 and screw 114 and inserting a locking pin therethrough.

An internally threaded square-shaped screw nut 120 is provided for coupling screw 114 to inner leg 112. In particular, the periphery of screw nut 120 is integrally connected to leg 112 during assembly of leg member 40 such as by welding. Thus nut 120 and leg 112 move together as a unit.

Since leg screw 114 is fixed at its upper end to housing 110, rotation of screw 114 causes nut 120 and hence inner legs 112 to travel downwardly relative to housing 110. Thus rotation of screw 114 causes slidable telescopic extension of inner leg 112 relative to housing 110.

The outer surface of inner leg 112 is preferably marked at regular intervals to provide a visual indication of the extent of leg extension.

A bushing 122 is fitted at the lower end of leg screw 114 as shown in FIG. 13. Bushing 122 is dimensioned to rotate freely relative to screw 114 and is provided to limit lateral flexing of screw 114 as it is rotated. A stop plate 124 is provided to prevent bushing 122 from sliding free from the lowermost end of screw 114. Upward travel of bushing 122 relative to screw 114 is limited by a shoulder 126 formed in screw 114. If shoulder 126 is omitted, bushing 122 has a tendency to travel upwardly relative to screw 114 when inner leg 112 is retracted due to frictional forces.

As shown best in FIGS. 1-3, the lowermost end of each inner leg 112 is provided with a load transferring boot 128 for engaging the underlying support surface, such as a sandy seabed. The design of boot 128 may vary depending upon soil conditions. For example, boot 128 illustrated in the drawings is designed to spread a load onto a soft seabed. A boot 128 having a pointed end with a small mud mat may be more suitable for harder soils. Boots 128 are shaped to maximize the distance therebetween so as not to obstruct deployment of clamping apparatus 10 on conduit 11 (FIG. 1). In some applications extra weight is mounted on boots 128 so that the overall centre of gravity of frame 13 is below trunnions 48, thus ensuring that support legs 40 hang vertically as discussed above.

In order to limit corrosion of support legs 40 after deployment in salt water, non-ferrous anode bars 130 may be mounted on the outer surface of outer housing 110 and inner leg 112 (FIGS. 1-3). The anode bar 130 mounted on inner leg 112 is preferably secured to a mounting plate having a outwardly tapered upper end so that it does not interfere with complete retraction of inner leg 112.

Hasps 154 may also be mounted on support legs 40 for attachment to underwater cables.

As should be apparent to someone skilled in the art, other means for anchoring frame 13 on an underlying support surface other than extensible legs 40 may be employed. For example, multiple scissor linkages or telescopic legs which are not screw activated could be substituted.

As shown best in FIGS. 1-3, toolpost 105 is provided for use in deploying clamping apparatus 10. Toolpost 105 is designed to slide onto mounting post 44 extending upwardly from frame crosspiece 42. Toolpost 105 includes a pin linkage 109 releasibly insertable in aperture 46 formed in mounting post 44 (FIG. 3). Toolpost 105 also includes a pair of hydraulic tool holders 108 fitted with hydraulic impact wrenches or the like (not shown) which are mountable on the hexagonal end portions 116 of leg screws 114 projecting from the upper end of leg member housings 110 (FIGS. 3 and 13). The uppermost end of toolpost 105 has a hasp 111 formed therein for securing a suspension cable. As discussed below, toolpost 105 may function as a frame for supporting lights, cameras, hydraulic cylinders, hydraulic lines, inclinometers and other accessories required to deploy clamping apparatus 10.

In operation, clamping apparatus 10 is lowered on to a length of conduit 11 laid over an irregular seabed. As shown schematically in FIG. 1, clamping apparatus 10 is typically lowered from a surface vessel such as a floating barge which can be maintained in a relatively stationary position over the installation site of interest.

In the case of a barge this is usually done with anchors, cables and winches. Other surface vessels may be equipped with thrusters and a positioning system such as a satellite link or positioning beacons.

The surface vessel must be equipped with a crane capable of lowering clamping apparatus 10 to the ocean bottom. In shallower waters a pre-deployment survey of a given site and the actual deployment may be accomplished by divers. In deeper waters underwater remote controlled equipment must be used, such as an underwater remote operated vehicle (ROV) fitted with cameras and having dual or multiple manipulator arms.

The installation site is initially surveyed by lowering a calibrated range pole in the vicinity of the pipe span to be supported. Depending upon the depth of deployment, the range pole is either lowered directly from the surface vessel, or it is mounted in a vertical orientation in one of the manipulator arms of the remote underwater vehicle. The other remote manipulator arm is typically fitted with a hydraulic impact wrench for actuation of the clamping apparatus clamp locking assembly. After the remote underwater vehicle has located the conduit 11, its exact location is determined. This is achieved by locating numbers pre-applied to conduit 11 as it was laid or from surveys undertaken after conduit laying. The installation site is monitored via a remote control camera as the range pole is placed next to conduit span 11. An elevation reading is then taken to determine the distance from conduit 11 to the ocean bottom. This information is then used to determine whether extensible leg members 40 are long enough. In some instances supplementary leg extension pieces (not shown), connectable to inner legs 112, are required. If the ocean bottom has a cross slope, clamping apparatus 10 may be fitted with one supplementary leg extension only.

While the installation site is surveyed as aforesaid by the ROV, clamping apparatus 10 is readied for use on the surface vessel. With reference to FIG. 3, toolpost 105 is fitted onto tubular mounting post 44. Toolpost pin linkage 109 is fitted into aperture 46 formed in mounting post 44 to releasibly secure toolpost 105 to swing frame 13. As previously described, toolpost 105 includes tool holders 108 for housing hydraulic impact wrenches or the like which may be fitted onto the hexagonal end portions 116 of leg screws 114 projecting from the upper ends of support leg housings 110. Toolpost 105 also functions as a mounting support for various other equipment such as cameras, lights and inclinometers.

Hydraulic power for the impact wrenches and other equipment is either supplied through hydraulic lines extending directly from the surface vessel, or from a submersible hydraulic power pack (not shown) connectible to toolpost 105. The hydraulic power pack is equipped with surface controlled valving and, when deployed, is preferably suspended in a cage by means of lifting slings approximately 25 feet above toolpost 105. Electric power and valving control wiring is provided to the hydraulic power pack from the surface by means of an umbilical cable spooled over the side of the surface vessel together with the main crane support cable. Conventional hydraulic lines are used to provide hydraulic flow from the power pack to the impact wrenches housed within tool holders 108.

Prior to lowering clamping apparatus 10 into the water, proper closing action of clamps 20 and seating of locking bolt 60 is preferably checked by lowering clamping apparatus 10 on to a test piece of conduit mounted on the surface vessel. Proper releasable mounting of toolpost 105 on mounting post 44 and operation of screw-activated extensible legs 40 should also be routinely tested at the surface prior to deployment. If not already pre-installed, load transferring boots 128 are fitted to the ends of inner extensible legs 112.

Clamping apparatus 10 and connected toolpost 105, together with the hydraulic power pack (if required), are then lowered over the side of the surface vessel. The depth of deployment of clamping apparatus 10 may be monitored by referring to distance markings on the crane cable. As clamping apparatus 10 approaches the ocean bottom, the cameras fitted on the remote underwater vehicle may be used to track lights mounted on toolpost 105. Surface operators can thus monitor and control the descent of clamping apparatus 10 by suitably manipulating the surface vessel's crane as apparatus 10 is lowered toward the range pole.

With the aid of continued surface monitoring and control as aforesaid, clamping apparatus 10 is gradually lowered onto conduit span 11. Flared guide plates 37 extending from the lower portion of saddle 12 guide saddle 12 on to conduit 11, thus aligning the longitudinal axes of saddle 12 and conduit 11.

As semi-circular saddle upper wall 16 is seated on the upper portion of conduit 11, clamps 20 are automatically swung into their closed positions engaging the lower portion of conduit 11 (FIGS. 5–6 and 9–11). In particular, the second ends 30 of respective clamp halves 20(a) and 20(b) swing upwardly and outwardly as they contact conduit 11, thereby swinging clamp halve first ends inwardly and downwardly toward one another through the plane of saddle sidewalls 14. Swinging movement of clamp half 20(a) causes locking bolt 60 to assume a generally horizontal orientation underneath conduit 11 as shown in FIG. 6. As described above, the exposed, free end of locking bolt 60 is pivotably carried into a slotted plate 33 as clamp halves 20(a), 20(b) close around conduit 11.

If conduit 11 is downwardly or upwardly inclined, frame 13 will swing relative to saddle 12 about trunnions 48 as saddle 12 is seated on conduit 11. This ensures that support legs 40 will hang substantially vertically irrespective of the angle of inclination of conduit 11 and saddle 12 (FIG. 12).

At this point, the ROV is used to conduct a visual inspection to ensure that clamps 20 are properly closed and that locking bolt 60 is correctly seated as aforesaid. Inclinometers (not shown) mounted on toolpost 105 are checked to ensure that frame 13 is extending vertically. In the event of incorrect closure or seating, clamping apparatus 10 is simply lifted free of conduit 11 by the surface operated crane and reset. When clamping apparatus 10 is lifted clear of conduit elastomeric cords 35 automatically urge clamps 20 to the open position. Stop bar 27 integrally connected to respective clamp hinge sleeves 24 prevents clamp halves 20(a), 20(b) from over-rotating past the preferred open position (FIG. 5).

Figure 8:
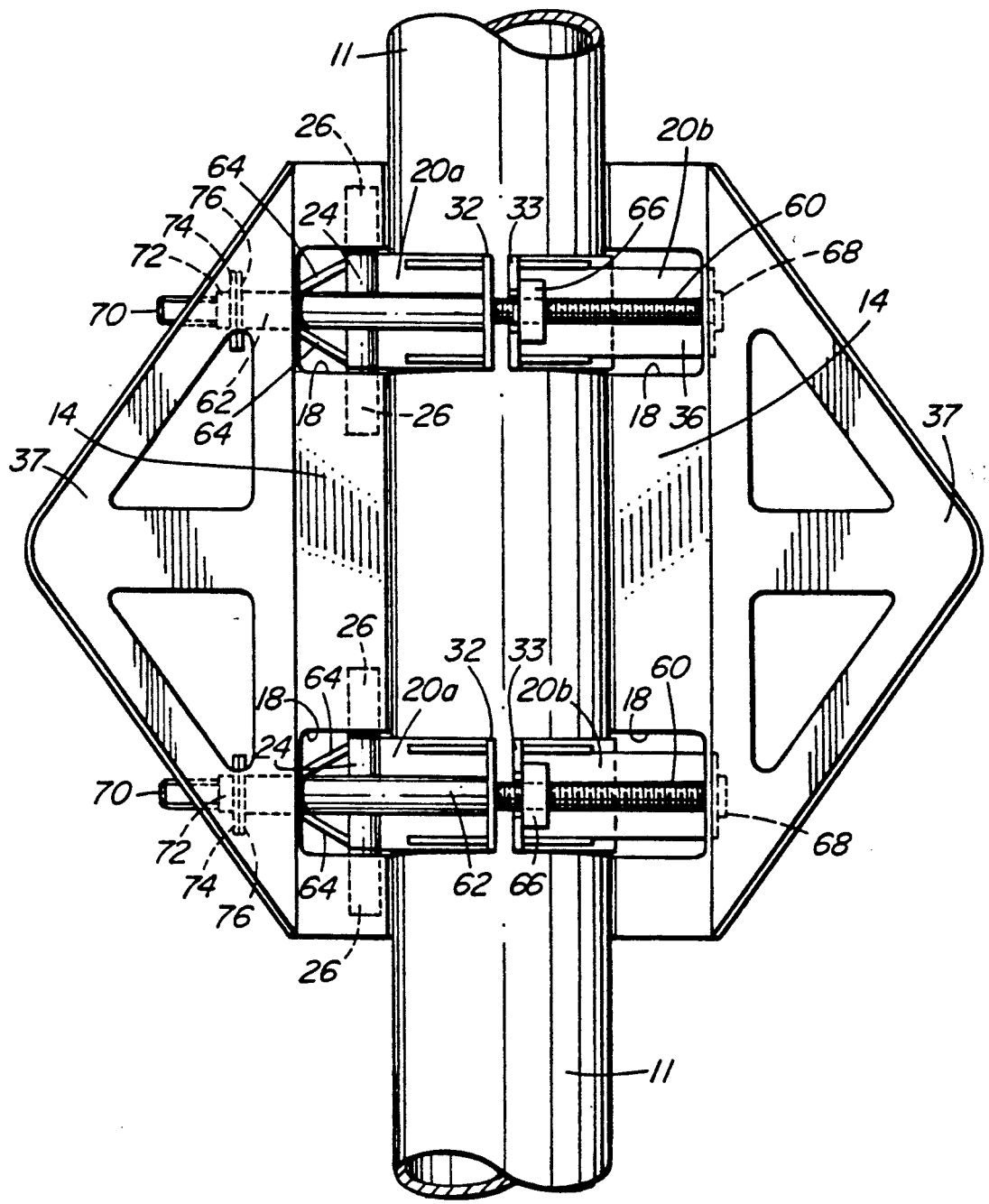
FIG. 8 is an enlarged, bottom plan view of the clamping apparatus, showing the clamping assembly in a closed configuration and showing one embodiment of the locking assembly in a locked configuration.

Once it has been determined that clamping apparatus 10 is properly deployed, clamps 20 are locked in the closed position. In particular, the remote underwater vehicle is manouvered to fit the hydraulic impact wrench pre-mounted in one of its manipulator arms onto the hexagonal coupling nut 70 secured to bolt 60. Another manipulator arm may be braced on frame cage 113 for added stability. Rotation of nut 70 and hence bolt 60 causes block nut 66 to travel partially along the length of bolt 60, toward bolt housing 62, until nut 66 is seated securely against plate 33, thus locking clamp halves 20(a) and 20(b) together (FIGS. 6 and 8). Other saddle clamps 20 are locked in similar fashion.

If clamping apparatus 10 is fitted with the alternative locking assembly illustrated in FIGS. 9-12, then saddle clamps 20 are locked by securing the ROV's hydraulic impact wrench to either one of the hexagonal end portions 82 of shaft 80. As previously described, rotation of shaft 80 causes nuts 90, 92 to travel outwardly, thus applying an inwardly directed clamping force to clamp halves 20(a) and 20(b) as shown in FIG. 11.

In the further alternative embodiment of clamping apparatus 10 shown in FIG. 14, which does not employ self-closing clamps 20, both closure and locking of clamp halves 20(a) and 20(b) is actuated by rotation of shaft 80 as described above.

As should be apparent to someone skilled in the art, in shallower water, locking of clamps 20 may be accomplished by divers carrying hydraulic impact wrenches rather than via a remote underwater vehicle.

As clamping apparatus 10 is seated on conduit 11 the weight of apparatus 10 is transferred from the ship board crane to conduit 11. This added load on conduit 11 causes a deflection in the span. Accordingly, after clamps 20 are securely locked in the closed position as described above, a reading is taken on the previously postioned range pole to determine how much conduit 11 must be raised to return it to its original position. This distance is added to a pre-calculated distance to reflect the loading requirements of the frame support legs 40. One of frame support legs 40 is then extended as described above. In particular, power is supplied to one of the hydraulic wrenches within tool holders 108 (mounted on toolpost 105) to rotate the associated leg screw 114, telescopically extending inner leg 112 relative to outer housing 110 (FIG. 13). As boot 128 contacts the seabed, frame 13 will begin to support part of the load of conduit 11, causing conduit 11 to deflect upwardly and laterally.

Once approximately half the required height correction has been achieved by extending one of the inner legs 112 as aforesaid, extension of that inner leg 112 stops. The inner leg 112 of the other support leg 40 is then extended in similar fashion thus further raising and deflecting conduit 11 in a balanced manner until conduit 11 is returned to its original position. Final adjustments are made to each of the respective support legs 40 until the correct distance reading is indicated on the range pole.

After a final visual check is made via the ROV, toolpost linkage pin 109 is released, either by actuation of the hydraulic ram mounted on toolpost 105, manually by an underwater diver, or via an ROV manipulator arm. Toolpost 105 and attached tool holders 108 are then raised clear of clamping apparatus 10 by the surface operated crane. Toolpost 105 and the hydraulic power pack may then be raised to the surface vessel for connection to another clamping apparatus 10. The deployment procedure detailed above is then repeated.

Following the procedure described above, installation of clamping apparatus 10 may be accomplished much more quickly than conventional grout bag supports. For example, in one representative session 4 units were installed in less than 24 hours at water depths approaching 1400 feet.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A self-closing clamping apparatus for engaging and supporting an elongate body, such as a length of conduit, comprising:
   a) a saddle shaped to conform to an exterior surface of said elongate body, said saddle having opposed side portions defining a compartment therebetween for receiving said elongate body; and
   b) clamping means hingedly connected to said saddle and swingable between an open position wherein a portion of said clamping means extends within said compartment and a closed position clampingly engaging a portion of said elongate body exterior surface, wherein placement of said elongate body into said compartment as said saddle is seated thereon forces said clamping means portion outwardly, thereby causing said clamping means to swing from said open position to said closed position.

2. A clamping apparatus as defined in claim 1 wherein said clamping means comprises a pair of clamps, each clamp being hingedly connected to one of said saddle side portions.

3. A clamping apparatus as defined in claim 2 wherein said saddle side portions are slotted to permit swinging movement of said clamps between said open and closed positions through said saddle side portions.

4. A clamping apparatus as defined in claim 3, wherein each of said clamps comprise a clamping surface shaped to conform to said elongate body exterior surface, said clamping surface having a first end extending outwardly of said saddle side portions in said open position and a second end comprising said clamping means portion extending within said compartment in said open position.

5. A clamping apparatus as defined in claim 4, wherein placement of said elongate body into said compartment as said saddle is seated on said elongate body forces said clamping surface second ends outwardly away from one another, thereby swinging said clamping surface first ends inwardly toward one another.

6. A clamping apparatus as defined in claim 4, further comprising biasing means for urging said clamping means toward said open position, said biasing means comprising a tensile member connectible between said clamping surface first ends.

7. A clamping apparatus as defined in claim 4, further comprising locking means for releasibly locking said clamping surface first ends together.

8. A clamping apparatus as defined in claim 7, wherein said locking means comprises a bolt rotatably coupled to one of said clamps and swingable therewith.

9. A clamping apparatus as defined in claim 8, wherein said locking means further comprises:
   a) a housing integrally connected to one of said clamps for rotatably receiving an end portion of said bolt, wherein said housing is adapted for restricting axial travel of said bolt; and
   b) a nut threadedly connected to said bolt, wherein rotation of said bolt when said clamps are in said closed position causes axial travel of said nut between an unlocked position remote from said housing and a locked position seated securely against the other of said clamps proximate said housing.

10. A clamping apparatus as defined in claim 9, wherein said other clamp comprises a plate extending from its first end having a slot formed therein for receiving a central portion of said bolt when said clamps are in said closed position, wherein said nut is seated against said plate in said locked position.

11. A clamping apparatus as defined in claim 9, wherein said other clamp further comprises means for restricting rotation of said nut when said clamps are in said closed position.

12. A clamping apparatus as defined in claim 2, further comprising locking means for releasibly locking said pair of clamps in said closed position, said locking means comprising:
   a) a housing mounted on said saddle;
   b) a bolt rotatable within said housing; and
   c) linkage means for operatively connecting said bolt to each of said pair of clamps.

13. A clamping apparatus as defined in claim 12, wherein said bolt has a central portion and left hand threaded and right hand threaded portions, said linkage means comprising:
   a) a pair of nuts, wherein each nut is threadedly connected to one of said left hand threaded or right hand threaded portions;
   b) a pair of hinge pins, wherein each hinge pin is connected to one of said clamps and is movable therewith;
   c) linkage arms for operatively connecting said nuts to said hinge pins, each linkage arm having a first end coupled to one of said nuts and a second end coupled to one of said hinge pins,
wherein rotation of said bolt within said housing causes outward travel of said nuts toward a locked position remote from said central portion and counter-rotation of said bolt causes inward travel of said nuts toward an unlocked position proximate said central portion.

14. A clamping apparatus as defined in claim 13, wherein said linkage arm second ends are slotted to enable sliding movement of said hinge pins relative to said linkage arms when said clamps swing between said open and closed positions.

15. A clamping apparatus as defined in claim 2, adapted for engaging a length of cylindrical conduit elevated above a support surface, wherein said saddle comprises a semicylindrical upper surface extending between said saddle side portions for overlying an upper portion of said conduit, and wherein each of said clamps comprise an arcuate clamping surface for engaging at least a lower portion of said conduit in said closed position.

16. A clamping apparatus as defined in claim 15, further comprising anchor means coupled to said saddle for anchoring said clamping apparatus on said support surface.

17. A clamping apparatus as defined in claim 16, wherein said anchor means further comprises a pair of support legs, each support leg being pivotally connected to one of said saddle side portions, wherein said support legs are adapted for extending between said elevated conduit and said support surface.

18. A clamping apparatus as defined in claim 17, wherein the centre of gravity of said support legs is below the point of pivotal connection of said support legs to said saddle, whereby said support legs extend in a substantially vertical plane irrespective of the angle of inclination of said saddle relative to said support surface.

19. A clamping apparatus as defined in claim 17, wherein said support legs are angled outwardly relative to said saddle to provide lateral support for said elevated conduit.

20. A clamping apparatus as defined in claim 17, wherein said support legs comprise telescopic shafts adjustable between retracted and deployed positions.

21. A clamping apparatus as defined in 20, wherein said support legs further comprise elongated screws rotatable within said respective shafts for adjusting said shafts between said retracted and deployed positions.

22. A clamping apparatus as defined in claim 21, further comprising means on said clamping apparatus for releasibly coupling a hydraulic wrench to said screws.

23. A clamping apparatus as defined in claim 17, wherein said support legs further comprise flared boots mounted at a lower end thereof for securely engaging said support surface and for spreading the load of said conduit on said support surface.

24. A clamping apparatus as defined in claim 17, wherein upper portions of said support legs are integrally joined by a transverse crosspiece, said support legs and said crosspiece together defining a swingable yoke straddling said saddle.

25. A clamping apparatus as defined in claim 24, wherein said crosspiece further comprises an apertured upright post to facilitate placement of said saddle on said conduit.

26. A clamping apparatus as defined in claim 1, further comprising biasing means for urging said clamping means towards said open position.

27. A clamping apparatus as defined in claim 1, further comprising locking means for releasibly locking said clamping means in said closed position, wherein said locking means applies a force to said clamping means, thereby causing said clamping means to securely clasp said elongate body in said closed position.

28. A clamping apparatus as defined in claim 27, wherein said locking means comprises:
   a) a housing mounted on said saddle;
   b) a bolt rotatable within said housing; and
   c) linkage means for operatively connecting said bolt to said clamping means.

29. A clamping apparatus as defined in claim 1, further comprising guide means integrally connected to said saddle side portions for guiding said conduit into said compartment.

30. A clamping apparatus for engaging an elongate body and for supporting said elongate body on a support surface comprising:
   a) a saddle shaped to conform to an exterior surface of said elongate body, said saddle having opposed side portions defining a compartment therebetween for receiving said elongate body;
   b) clamping means mounted on said saddle for clampingly engaging said elongate body; and
   c) anchor means coupled to said saddle for extending from said saddle to said support surface, said anchor means being pivotable about a pivot axis intersecting said saddle side portions.

31. A clamping apparatus as defined in claim 30, wherein said clamping means is hingedly connected to said saddle and is swingable relative to said saddle between an open position extending outwardly of said saddle and a closed position clasping said elongate body exterior surface.

32. A clamping apparatus as defined in claim 31, further comprising locking means for releasibly locking said clamping means in said closed position, wherein said locking means applies a force to said clamping means, thereby causing said clamping means to securely clasp said elongate body in said closed position.

33. A clamping apparatus as defined in claim 32, wherein actuation of said locking means causes swinging movement of said clamping means.

34. A clamping apparatus as defined in claim 33, wherein said locking means comprises:
 a) a housing mounted on said saddle;
 b) a bolt rotatable within said housing; and
 c) linkage means for operatively connecting said bolt to said clamping means.

35. A clamping apparatus as defined in claim 31, adapted for engaging a length of cylindrical conduit elevated above said support surface, wherein said saddle comprises opposed side portions and a semi-cylindrical upper surface extending between said saddle side portions for overlying an upper portion of said conduit, said clamping means comprising a pair of clamps, each clamp being hingedly connected to one of said saddle side portions.

36. A clamping apparatus as defined in claim 35, further comprising locking means for releasibly locking said pair of clamps in said closed position, said locking means comprising:
 a) a housing mounted on said saddle;
 b) a bolt rotatable within said housing; and
 c) linkage means for operatively connecting said bolt to each of said pair of clamps.

37. A clamping apparatus as defined in claim 36, wherein said bolt has a central portion and left hand threaded and right hand threaded portions, said linkage means comprising:
 a) a pair of nuts, wherein each nut is threadedly connected to one of said left hand threaded or right hand threaded portions;
 c) a pair of hinge pins, wherein each hinge pin is connected to one of said clamps and is movable therewith;
 d) linkage arms for operatively connecting said nuts to said hinge pins, each linkage arm having a first end coupled to one of said nuts and a second end coupled to one of said hinge pins,
wherein rotation of said bolt within said housing causes outward travel of said nuts toward a locked position remote from said central portion and counter-rotation of said bolt causes inward travel of said nuts toward an unlocked position proximate said central portion.

38. A clamping apparatus as defined in claim 37, wherein said linkage arm second ends are slotted to enable sliding movement of said hinge pins relative to said linkage arms when said clamps swing between said open and closed positions.

39. A clamping apparatus for engaging an elongate body and for connecting said elongate body to a support surface comprising:
 (a) a frame having opposed side portions for receiving said conduit therebetween;
 (b) clamping means hingedly coupled to said frame for clampingly engaging said elongate body, said clamping means being swingable about a hinge axis between open and closed positions; and
 (c) anchor means coupled to said frame for extending from said frame to said support surface, said anchor means being pivotable about a pivot axis intersecting said frame side portions,
wherein said hinge axis and said pivot axis extend in non-parallel planes.

40. A clamping apparatus as defined in claim 39, wherein said pivot axis extends in a plane perpendicular to a vertical plane passing through said hinge axis.

41. A clamping apparatus as defined in claim 39, wherein said elongate body is a conduit elevated above said support surface, and wherein said anchor means comprises extensible legs pivotally coupled to said frame side portions for extending from said frame to said support surface.

42. A clamping apparatus as defined in claim 41, wherein the centre of gravity of said anchor means is below said frame, whereby said extensible legs hang in a vertical orientation irrespective of the angle of inclination of said frame.

43. A clamping apparatus as defined in claim 41, wherein said clamping means further comprises a clamp portion extending at least partially between said frame side portions in said open position, wherein said clamp portion contacts said conduit when said clamping apparatus is seated thereon, thereby causing said clamping means to swing about said hinge axis to said closed position wherein said clamping means engages at least a lower portion of said conduit.

44. A clamping apparatus as defined in claim 43, wherein said clamping means comprises a pair of clamps, each clamp being hingedly connected to one of said frame side portions and comprising a clamping surface shaped to conform to an exterior surface of said conduit.

45. A clamping apparatus as defined in claim 44, wherein said frame is shaped to conform to an upper portion of said conduit exterior surface.

46. A clamping apparatus as defined in claim 43, further comprising biasing means for urging said clamping means toward said open position.

47. A clamping apparatus as defined in claim 43, further comprising locking means for releasibly locking said clamping means in said closed position.

48. A clamping apparatus as defined in claim 47 wherein said locking means is mounted on an upper portion of said frame above said clamping means.

* * * * *